(12) United States Patent
Van Wagoner

(10) Patent No.: US 10,399,373 B2
(45) Date of Patent: Sep. 3, 2019

(54) TWO-SIDED HINGED REPOSITIONABLE NOTE

(71) Applicant: Jon Phillip Van Wagoner, Lake Oswego, OR (US)

(72) Inventor: Jon Phillip Van Wagoner, Lake Oswego, OR (US)

(73) Assignee: Stik Out Cards, LLC, Lake Oswego, OR (US)

( * ) Notice: Subject to any disclaimer, the term of this patent is extended or adjusted under 35 U.S.C. 154(b) by 0 days.

(21) Appl. No.: 15/852,485

(22) Filed: Dec. 22, 2017

(65) Prior Publication Data

US 2018/0117939 A1    May 3, 2018

Related U.S. Application Data

(63) Continuation-in-part of application No. 14/322,875, filed on Jul. 2, 2014, now Pat. No. 9,849,710.

(Continued)

(51) Int. Cl.
| | |
|---|---|
| *B42D 1/10* | (2006.01) |
| *B42D 5/00* | (2006.01) |
| *B41L 1/22* | (2006.01) |
| *C09J 7/38* | (2018.01) |
| *G09F 3/10* | (2006.01) |

(Continued)

(52) U.S. Cl.
CPC .......................... *B41L 1/22* (2013.01); *B32B 7/14* (2013.01); *B42D 1/006* (2013.01); *B42D 1/10* (2013.01); *C09J 7/38* (2018.01); *G09F 3/10* (2013.01); *B42D 5/003* (2013.01)

(58) Field of Classification Search
CPC ........... B42D 1/006; B42D 1/10; B42D 5/003

USPC ................. 281/22, 24, 38, 40, 41; 428/40.1; 402/79

See application file for complete search history.

(56) References Cited

U.S. PATENT DOCUMENTS

| | | |
|---|---|---|
| 2,321,184 A | 6/1943 | Miller |
| 3,290,809 A | 12/1966 | King |
| | (Continued) | |

FOREIGN PATENT DOCUMENTS

| | | |
|---|---|---|
| CA | 2636672 A1 | 1/2010 |
| CN | 201161490 | 12/2008 |
| | (Continued) | |

OTHER PUBLICATIONS

FR-2839009-A1 Abstract.*

(Continued)

*Primary Examiner* — Kyle R Grabowski

(57) ABSTRACT

A two-sided articulating note comprises a generally flat writing portion having opposing front and back sides and a hinged edge, an anchor portion, and a joint portion between the anchor portion and the hinged edge. A method of using the note configures the note in a first configuration by securing the anchor portion to an object so that the front side of the writing portion is exposed and the back side of the writing portion faces the object while the note lies flat, writes on the front side of the writing portion while the note is in the first configuration, configures the note in a second configuration by folding over the note about the joint portion to cause the back side of the writing portion to be exposed, and writing on the back side of the writing portion while the note is in the second configuration.

13 Claims, 8 Drawing Sheets

Related U.S. Application Data

(60) Provisional application No. 61/843,410, filed on Jul. 7, 2013.

(51) Int. Cl.
*B32B 7/14* (2006.01)
*B42D 1/00* (2006.01)

(56) References Cited

U.S. PATENT DOCUMENTS

| | | | |
|---|---|---|---|
| 4,113,538 | A | 9/1978 | Green |
| 4,127,690 | A | 11/1978 | Schleifenbaum et al. |
| 4,215,879 | A | 8/1980 | Blum |
| 4,382,539 | A | 5/1983 | Kronman |
| 4,558,980 | A | 12/1985 | Sturdivan |
| 4,643,452 | A | 2/1987 | Chang |
| 4,711,347 | A | 12/1987 | Drexler et al. |
| 4,849,056 | A | 7/1989 | Ristuccia |
| 4,905,392 | A | 3/1990 | Klein |
| 4,930,234 | A | 6/1990 | Schmidt |
| 4,963,049 | A | 10/1990 | Pearson |
| 5,016,370 | A | 5/1991 | Rhian et al. |
| 5,040,216 | A | 8/1991 | Policht |
| 5,089,337 | A | 2/1992 | Hochfeld |
| 5,098,129 | A | 3/1992 | Haber |
| 5,248,164 | A | 9/1993 | Lepretre |
| 5,318,825 | A | 6/1994 | Naber |
| 5,329,713 | A | 7/1994 | Lundell |
| 5,524,998 | A | 6/1996 | Schwartz |
| 5,575,574 | A | 11/1996 | Mertens |
| 5,683,194 | A | 11/1997 | Emmel et al. |
| 5,697,518 | A | 12/1997 | Callahan |
| 5,887,899 | A | 3/1999 | Dobbins |
| 5,924,227 | A | 7/1999 | Sommers |
| 5,955,166 | A | 9/1999 | Murphy |
| 5,980,676 | A | 11/1999 | Meetze |
| 6,120,184 | A | 9/2000 | Laurence et al. |
| 6,146,728 | A | 11/2000 | Bay |
| 6,179,337 | B1 | 1/2001 | Zumberge |
| 6,213,519 | B1 | 4/2001 | Bosch |
| 6,268,032 | B1 | 7/2001 | Mertens et al. |
| 6,360,465 | B1 | 3/2002 | Simpson |
| 6,546,657 | B2 | 4/2003 | Gray |
| 6,719,475 | B2 | 4/2004 | Arkwright |
| 6,910,667 | B2 | 6/2005 | O'Leary et al. |
| 7,086,559 | B2 | 8/2006 | Poole |
| 7,124,524 | B2 | 10/2006 | Valenti |
| 7,225,570 | B2 | 6/2007 | Windorski |
| 7,437,994 | B1 | 10/2008 | Ratzloff |
| 7,857,130 | B2 | 12/2010 | Bartusiak |
| 7,883,115 | B2 | 2/2011 | Keefe |
| 8,225,717 | B2 | 7/2012 | Ratzloff |
| 8,381,648 | B2 | 2/2013 | Ratzloff |
| 8,474,165 | B1 | 7/2013 | Hill et al. |
| 8,656,616 | B2 | 2/2014 | Ashpole et al. |
| 2002/0079691 | A1 | 6/2002 | Zumberge |
| 2002/0089171 | A1 | 7/2002 | Silvestre |
| 2002/0119273 | A1 | 8/2002 | Napierala |
| 2004/0093772 | A1 | 5/2004 | Gottlieb et al. |
| 2004/0174010 | A1 | 9/2004 | McGuiness |
| 2005/0191455 | A1* | 9/2005 | Hsu .......... B42D 5/003 428/40.1 |
| 2005/0193608 | A1 | 9/2005 | Flynn et al. |
| 2006/0057324 | A1 | 3/2006 | Phillips et al. |
| 2006/0107576 | A1 | 5/2006 | Hirst |
| 2007/0200336 | A1 | 8/2007 | Wilen |
| 2008/0063842 | A1 | 3/2008 | Callinan et al. |
| 2009/0278343 | A1 | 11/2009 | Fischer |
| 2011/0072701 | A1 | 3/2011 | Lemna |
| 2013/0192112 | A1 | 8/2013 | Yamamuro et al. |
| 2013/0240134 | A1 | 9/2013 | Flynn et al. |
| 2015/0014982 | A1 | 1/2015 | Wagoner |

FOREIGN PATENT DOCUMENTS

| | | | |
|---|---|---|---|
| DE | 8415028 U1 | 10/1984 | |
| DE | 4418923 A1 | 12/1995 | |
| DE | 29518816 U1 | 5/1996 | |
| DE | 19844798 A1 | 6/1999 | |
| EP | 0638441 B1 | 3/1998 | |
| EP | 1144202 A1 | 10/2001 | |
| FR | 2674794 A1 | 10/1992 | |
| FR | 2839009 A1 | 10/2003 | |
| FR | 2839009 A1 * | 10/2003 | ............ B42D 5/003 |
| GB | 332119 A | 7/1930 | |
| GB | 2462324 A | 2/2010 | |
| JP | 3144503 B2 | 3/2001 | |
| JP | 2001063250 A | 3/2001 | |
| JP | 2013046976 A | 3/2013 | |
| KR | 20090007448 A | 1/2009 | |
| SE | 531560 | 5/2009 | |
| WO | 03064172 A1 | 8/2003 | |

OTHER PUBLICATIONS

Chooftech, "Sticky business cards," http://ch00ftech.com/2007/08/31/sticky-buisiness-cards/, Aug. 31, 2007.
Footprints, "Sticky Full Colour Business Cards," 2012.
J. Van Wagoner, U.S. Appl. No. 14/322,875, "Two-Sided Hinged Repositionable Note," filed Jul. 2, 2014.
Mimi Hager, Feb. 24, 2012, http://5thgraderocks5thgraderules.blogspot.com/2012/02/posting-plurals.html.
Response to USPTO Office Action filed Dec. 23, 2015, U.S. Appl. No. 14/322,870.
Response to USPTO Office Action filed Jun. 28, 2017 in U.S. Appl. No. 14/322,870.
Response to USPTO Office Action filed May 3, 2015, U.S. Appl. No. 14/322,870.
RPM Products, "Business Cards, Peel & Stick, 1 Ink Color [BC-PSI]," http://rpmco.com/store/business-cards-peel-stick-color-p-56107009.html?osCsid=51974f114ad9e61a4447ed0859f4c543, Date Unknown.
RPM Products, "Business Cards, Peel & Stick, Black Ink [BC-PS]," http://rpmco.com/store/business-cards-peel-stick-black-p-56107008.html?osCsid=51974f114ad9e61a4447ed0859f4c543, Date Unknown.
Skott Chun, "Fedrigoni 2010 Calendar by Studio8," http://www.designyearbook.com/2009/12/fedrigoni-2010-calendar-by-studio8.html.
Smartpractice, "Full Color, Custom and Die Cut ReStix™," http://www.smartpractice.com/Apss/WebObjects/SmartPractice.woa/wa/category?on=Promotional-Giveaways-ReStix%26trad%3B-Full-Color&id=407125&m=SPM, Date Unknown.
USPTO, Office Action dated Dec. 29, 2016 in U.S. Appl. No. 14/322,870.
USPTO, Office Action dated Feb. 5, 2015, U.S. Appl. No. 14/322,870.
USPTO, Office Action dated Jun. 24, 2015, U.S. Appl. No. 14/322,870.
USPTO, Office Action dated Sep. 20, 2017, U.S. Appl. No. 14/322,870.

* cited by examiner

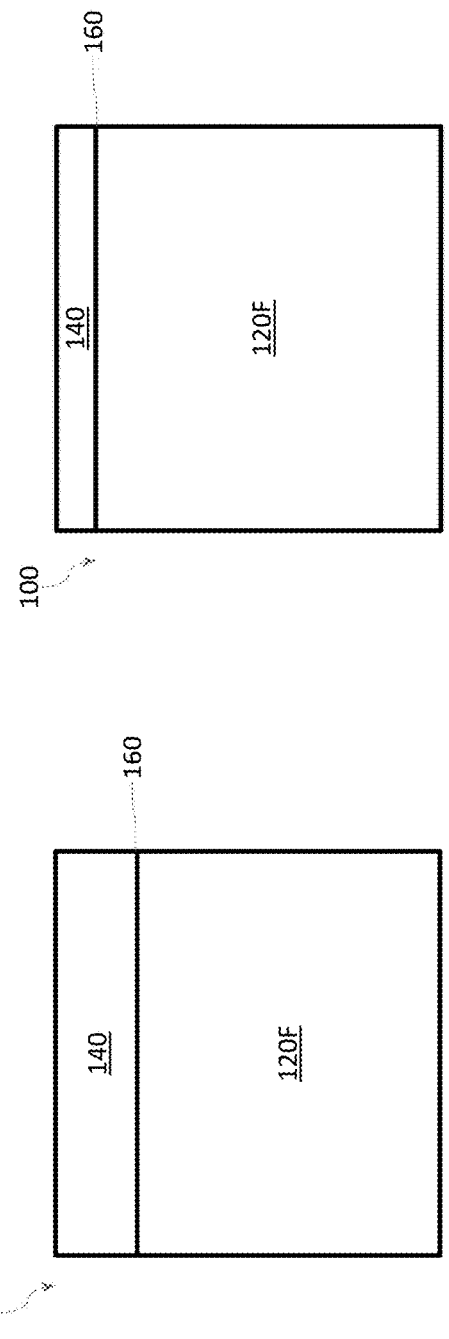
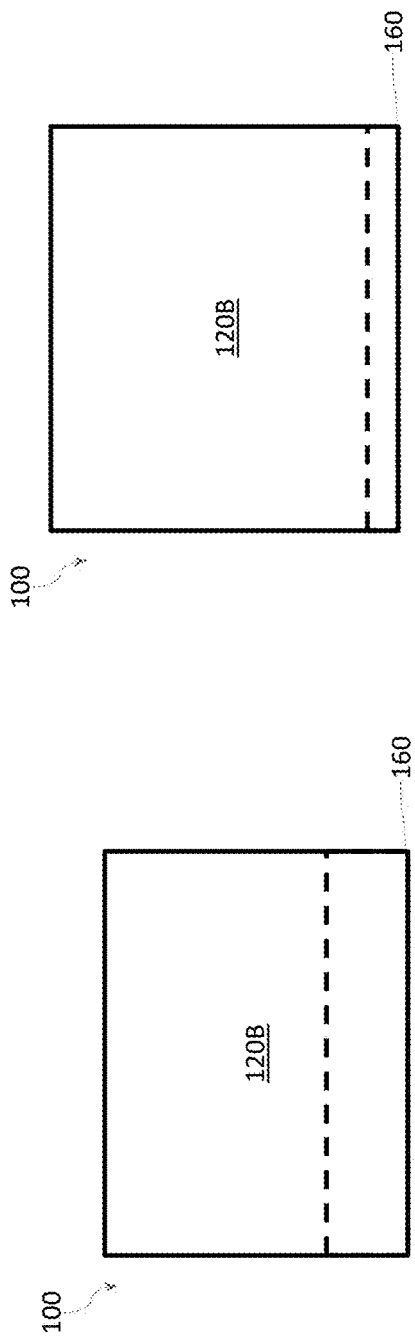
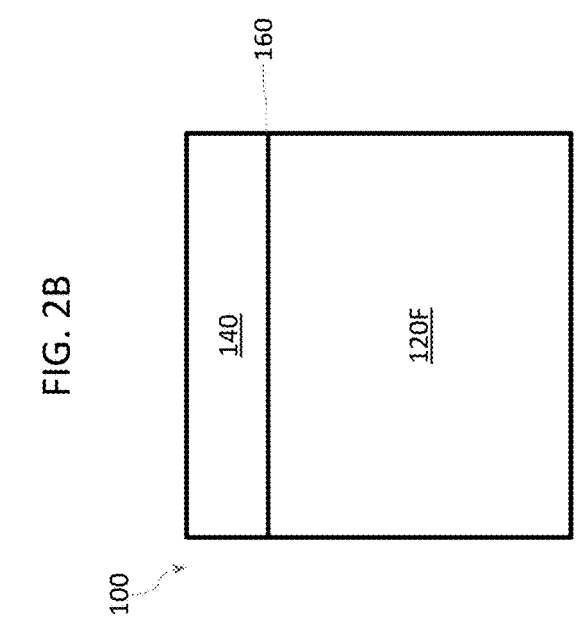
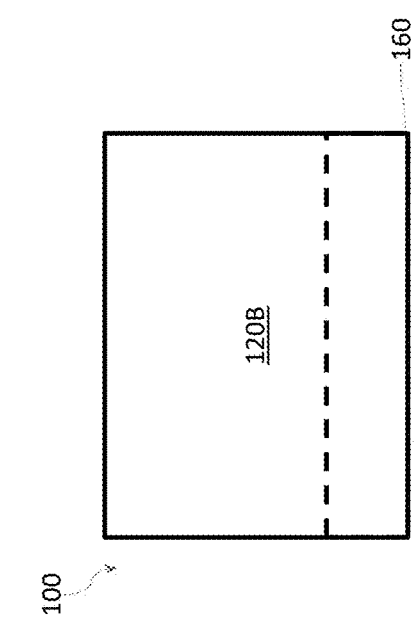

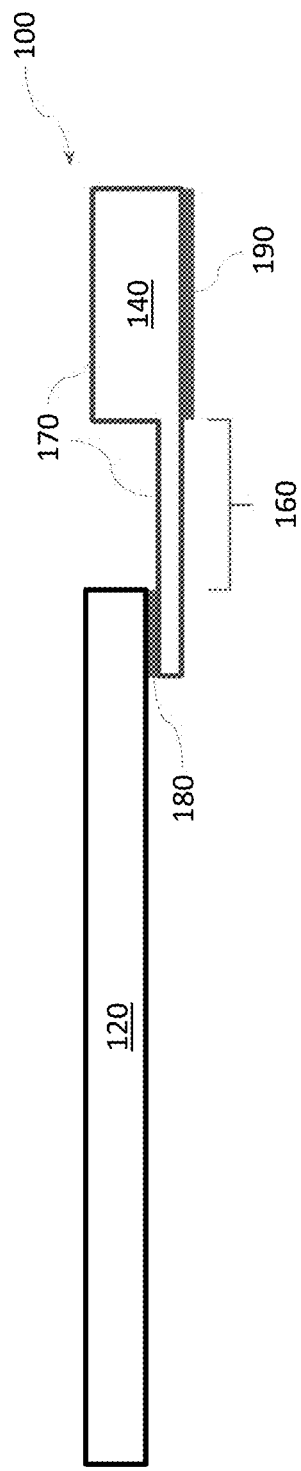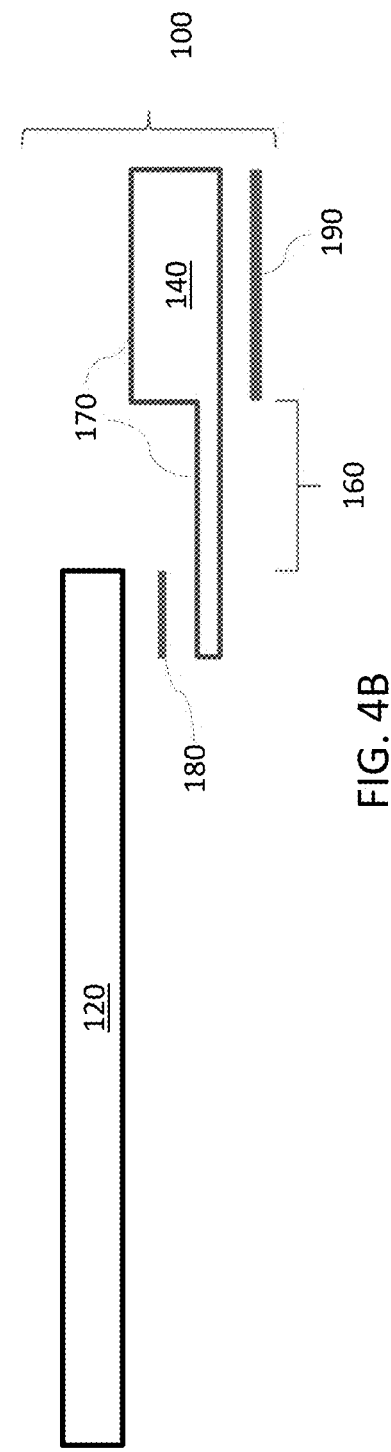
FIG. 4A
FIG. 4B

TWO-SIDED HINGED REPOSITIONABLE NOTE

RELATED APPLICATIONS

This application claims benefit under 35 U.S.C. § 120 as a continuation-in-part of U.S. patent application Ser. No. 14/322,875, entitled "Two-Sided Hinged Repositionable Note," filed Jul. 2, 2014, now U.S. Pat. No. 9,849,710, which claims priority under 35 U.S.C. § 119(e) to U.S. Provisional Patent Application No. 61/843,410, entitled "Two-Sided Hinged Repositionable Note," filed Jul. 7, 2013. The entire disclosures of both preceding applications are incorporated by reference herein.

This application is also related to U.S. patent application Ser. No. 14/322,870, entitled "Hinged Repositionable Business Card," filed Jul. 2, 2014, the entire disclosure of which is incorporated by reference herein. The teachings and disclosure set forth in that patent application regarding a business card are applicable to the case wherein the business card is a note.

TECHNICAL FIELD

The field of this disclosure relates generally to paper stationary with an adherable strip of adhesive on the back, designed for attaching notes to documents and other surfaces. Examples of such notes include STICKY NOTES® and POST-IT® notes.

BACKGROUND INFORMATION

Many companies now produce repositionable notes all of which have the same basic characteristics but may vary in color, size, shape, and/or indicia pre-provided on the notes. The back side of such notes typically have a re-adherable strip of pressure-activated or pressure-sensitive adhesive (PSA) along one edge, designed for temporarily attaching notes to documents and other surfaces, then removing the note, and possibly re-attaching it to the same or a different surface. The back side of each paper note has typically been treated with a chemical to allow the adhesive to adhere properly to the paper, whereas the front side of the note is not chemically treated.

One shortcoming with known repositionable notes is that users generally do not write on the back of repositionable notes. This can result in waste of resources. Often times a person needs to write or draw more than what can fit on the front side of one note. A second, third, and possibly additional notes are sometimes needed. To link or group those notes together for organizational purposes, it is typical to stick each note to the front side of another related note. However, known repositionable notes do not stick well to the front side of another such note. When grouping notes together in this manner, disorganization or loss of notes is more possible due to the low tack strength of such stacked notes. Moreover, sticking a note atop another note covers up at least a portion of the underneath note, requiring repeated removal and reapplication of stacked notes to access their content and then to reassemble the stack.

OVERVIEW OF DISCLOSURE

This patent document discloses various notes, such as repositionable notes, that feature a hinge, articulating joint, fold or the like and are generally referred to herein as Hinged Repositionable Notes (HRNs). One embodiment of an HRN employs an adherable strip of adhesive and a hinge. The adherable strip is preferably clear and re-adherable. The strip can be permanently or non-permanently attached to a piece of paper of various sizes. The hinge allows for writing on both sides of the paper note equally well by allowing the paper note to rotate 180°. Thanks to the clear adhesive strip on the HRN, the user can place the top of the HRN paper edge either between lines of text horizontally, between columns of text vertically or in any margin around a page of text, and the HRN will never need to be repositioned to access the text underneath. The HRN can simply be rotated out of the way to various degrees up to 180°, revealing the text it is covering.

The re-adherable strip of adhesive can be manufactured in various widths. A smaller width with less tack strength can be safely used on delicate papers and surfaces. If the user desires to reposition the HRN on these delicate paper types, they are free to do so without causing harm to the page as the smaller width of adhesive found on the HRN provides a low enough tack to prevent damage to the paper. A wider width with more tack strength can be safely used in office, home, and industrial settings.

HRNs have the useful feature of being stackable. Multiple notes can be stuck to each other by sticking to the back of the HRN, which may be chemically treated thus providing full adherence strength of all grouped notes. The grouped HRN can then be stored and viewed in a cascading order or removed from the surface as one unit and transported without becoming unattached from each other. The hinge allows endless ways to attach HRNs to the back side of each other. An HRN can also be adhered to the front side of another HRN to create an easel out of the notes for better viewing.

As one skilled in the art will appreciate in light of this disclosure, certain embodiments may be capable of achieving certain advantages, including, in some cases, some or all of the following: (1) conservation of paper resources, less paper waste, and more economical usage of repositionable notes for users and society; (2) more useful stacking of repositionable notes than possible with conventional non-articulated notes; (3) variable adhesive tack strength to permit use on more or less delicate objects upon application and removal; (4) facilitating the use of repositionable notes that do not obscure any underlying content, thereby avoiding the need to remove and re-apply the note to see what is underneath; (5) providing an easier way to tell the sticky end from the non-sticky end of the hinged note; and (6) facilitating simple conversion of a note into a non-sticky form. The following paragraphs elaborate on each of these advantages:

First, the hinge feature of the HRN allows the user to write on both sides of the paper note equally well by allowing the paper note to rotate 180°. This can result in an approximate doubling of the efficiency of paper utilization for repositionable notes. That can benefit society as a whole, as less forest products are consumed for repositionable notes, and also individual end users-consumers, who can purchase half as many sticky notes to hold the same amount of writing. According to one example embodiment, the front side of the HRN can contained a pre-printed water mark arrow symbol or "over" indicia, and a user can circle that mark, symbol or indicia as a reminder that that there is additional writing on the back side of the note. Alternatively, a user can simply write his or her own mark, symbol or indicia to the same effect.

Second, HRNs are more usefully stackable than known repositionable notes. Known repositionable notes do not stick as well to the front side of each other as to the back side. This is due to the fact that the back side is chemically treated with a chemical that enhances adhesion to the adhesive strip. This allows notes to be peeled apart from a stack, as they are sold, rather than ripping the adhesive strip off the back of a note. As a result, the tack strength of one note atop another note is less than ideal. When grouping notes together in this manner, disorganization or loss of notes is more possible due to low tack strength of sticking the note to the top of another note. Also, such stacking often covers print on the underneath note, causing users to remove the top note in order to view all of the note underneath and then reapply the top note. Repeated removal and reapplication exacerbates the problem by reducing the adhesive tack strength further. HRNs, on the other hand, can be stuck to each other by sticking to the backs, which if chemically treated like conventional non-articulating repositionable notes, provides full adherence strength of all grouped notes. The grouped HRN can then be stored and viewed in a cascading order or removed from the surface as one unit and transported without becoming unattached from each other. The hinge allows endless ways to attach HRNs to the back side of each other. HRNs can also be adhered to the front side of each other to create an easel out of the notes for better viewing.

Third, the tack strength of HRNs can be better adjusted to be more suitable and less damaging to a wider variety of objects. The tack strength of the re-adherable strip of adhesive on known repositionable notes can deform and damage delicate papers upon both application and removal. In fact, packaging of known repositionable notes often states a warning notice to the effect that the adhesive may not be suitable for use on delicate papers or surfaces. Immediately upon sticking known repositionable notes to thin paper, the paper may become deformed and curved. This can change the shape of the page, causing it not to turn as effectively. Moreover, removal of a repositionable note that is too tacky may rip a fragile page or lift ink off the page. The re-adherable strip of adhesive on a HRN can be manufactured in various widths. A smaller width of adhesive with less tack strength can be safely stuck to delicate papers and surfaces without deforming or damaging the delicate paper.

Fourth, an HRN may not obscure any underlying content on the page or other object to which it is attached, because the adhesive strip or anchor portion of the HRN may be transparent, and the remaining portion of the HRN can easily be turned over to reveal what is underneath it. Known repositionable notes, on the other hand, inherently cover what is underneath them, and the only way to reveal what is underneath a known repositionable note is to unstick it. This is undesirable and repositioning to preferred prior location can be problematic. HRNs do not suffer from that problem, especially if the adhesive anchor portion is clear or transparent. In fact, since the HRN can be positioned so that it is never permanently blocking, it can be permanently adhered to the page or other object. That is, the HRN need not be "repositionable" at all. Thus, certain embodiments may feature a stronger, even permanent or semi-permanent, adhesive.

Fifth, a user can more easily visually ascertain the top of a note when the anchor portion is colored differently or constructed from a different material from the rest of the note. One disadvantage of current repositionable note is that a user must handle the note pad to feel or thumb through to determine the top of the note (as opposed to the bottom of the notes) before writing. The top of a HRN, however, may be visible due to its clear or otherwise distinctive adhesive strip.

Sixth, an HRN can be easily converted into non-sticky form by simply folding over the sticky anchor portion and adhering it to the back of the note. The note in this form can be put in a pocket of clothing or otherwise used where adhesion is not desired. Such is not possible with current known repositionable notes.

The foregoing and other advantages of various embodiments will be apparent upon reading this document.

BRIEF DESCRIPTION OF THE DRAWINGS

FIG. 2A is a top view of a hinged note in a first, unfolded configuration, according to one embodiment.

FIG. 2B is a top view of the hinged note of FIG. 2A in a second, folded configuration.

FIG. 3A is a top view of a hinged note in a first, unfolded configuration, according to another embodiment.

FIG. 3B is a top view of the hinged note of FIG. 3A in a second, folded configuration.

FIG. 4A is a side view of a hinged note, according to one embodiment.

FIG. 4B is an exploded side view of the hinged note of FIG. 4A.

DETAILED DESCRIPTION OF EMBODIMENTS

With reference to the above-listed drawings, this section describes particular embodiments and their detailed construction and operation. The embodiments described herein are merely examples, set forth by way of illustration only and not limitation. Those skilled in the art will recognize in light of the teachings herein that there are alternatives, variations and equivalents to the example embodiments described herein. For example, other embodiments are readily possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Figure 1:
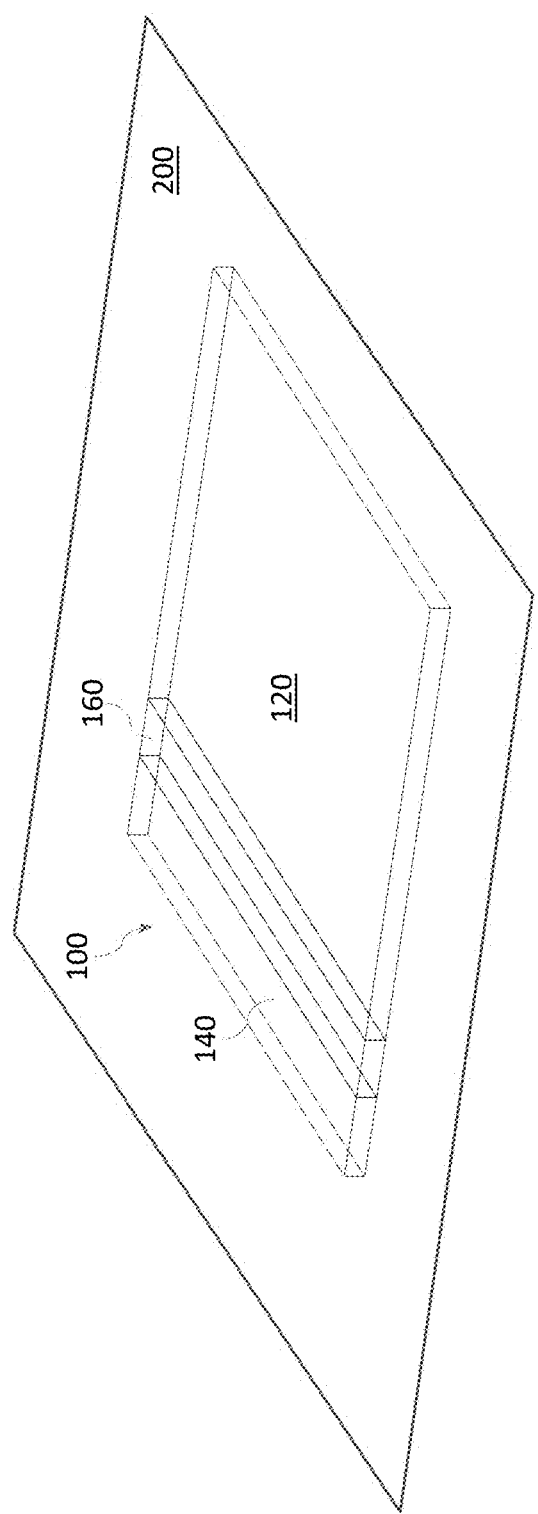
FIG. 1 is an isometric drawing of a hinged note according to one embodiment.

FIG. 1 is an isometric drawing of a hinged note 100 according to one example embodiment. The hinged note 100 is generally a planar sheet having opposing front and back sides, each of which is suitable to be written upon to bear indicia printed or otherwise applied to the note. As shown in FIG. 1, the front side is facing upward and the bottom side faces downward on an object 200, which may be, for example, a paper such as a page of a book. The hinged note 100 comprises three sections: A writing or message portion 120, an adhesive area or anchor portion 140, and a joint, folding, or hinge portion 160. In a first, front-up or "face-up" configuration, as shown in FIG. 1, the message portion 120, the anchor portion 140 and the hinge portion 160 are generally coplanar, thereby permitting the front side of the message portion 120 to be viewed and/or written upon. The message portion 120 may be paper or any other suitable material, such as a plastic. The message portion 120 may be a conventional repositionable note or formed from a conventional repositionable note.

The anchor portion 140 includes an adhesive area on the back side. This anchor portion 140 attaches the note 100 to the object 200. A suitable adhesive, such as, for example, a PSA, such as used with conventional repositionable notes, may be applied to the adhesive area. Any adhesive may be used, whereby the stickiness or tack of the adhesive is stronger or weaker, so as to suit the purpose of the note 100 and the surface characteristics of the object 200. Preferably, the adhesive has a tackiness sufficiently weak to be readily overcome manually to remove the note 100 from the surface of the item, yet the adhesive is sufficiently persistent after removal to reapply the note 100 to the same object 200 or a different surface. The adhesive may be permanent or semi-permanent but is preferably non-permanent such that the note 100 is removable from the object 200 and reusable or repositionable. The anchor portion is preferably a plastic but may be any suitable material.

The hinge portion 160 is disposed between the message portion 120 and the anchor portion 140 and is connected to both the message portion 120 and the anchor portion 140. The hinge portion 160 is capable of folding or articulating at least approximately 180° to fold over the message portion 120 while the anchor portion 140 remains secured to the object 200, thereby exposing the back side of the message portion 120 approximately flat against the object 200 so that a person can read from or write on the message portion 120. When so folded, the hinged note 100 preferably rests stably in that second, back-up or face-down configuration.

In some embodiments, the hinge portion 160 is a flexible material with a flexibility less than that of the message portion 120. The force required to bend or otherwise articulate the hinge portion 160 is ideally less than the adhesion strength of the adhesive on the back side of the anchor portion 140, so that folding of the hinge does not detach, and preferably does not even disturb, the grip of the anchor portion 140 to the object 200. The hinge portion 160 is preferably sufficiently flexible or bendable such that the hinged note 100 pivots readily approximately 180° about the hinge portion 160 in response to light manual force from a finger of a person or even blowing by a person. The hinge portion 160 may be a plastic material, such as a polyvinylidene chloride (commonly used as SARAN WRAP®) preferably having a thickness less than either or both of the message portion 120 and the anchor portion 140.

In another embodiment, the hinge portion 160 is a line of perforations that weakens the note 100 to permit folding. The width of the hinge portion 160 may be more or less depending its construction.

The anchor portion 140 may be substantially transparent or visually clear so that the object 200 underneath the anchor portion 140 is visible. In this way, any part of the object 200 can be revealed without removing the hinged note 100; instead, simply folding the note 100 over reveals a covered part of the object 200. Additionally, the hinge portion 160 may also be substantially transparent.

FIGS. 2A and 2B are top views of the hinged note 100 in a first, unfolded configuration and a second, folded configuration, respectively. In FIG. 2A, the note 100 is face up in a first configuration so that the front side 120F of the message portion 120 is in view. In FIG. 2B, the note 100 has been folded or rotated about its hinge or articulating joint in the hinge portion 160 to reveal the back side 120B of the message portion 120. In that second configuration of FIG. 2B, the anchor portion 140 is covered by part of the message portion 120 proximate the hinge portion 160.

FIGS. 3A and 3B are like FIGS. 2A and 2B but illustrate the hinged note 100 having a smaller anchor portion 140 and thus a smaller adhesive area. The tackiness or stickiness of the note 100 depends on several factors, including the size of the adhesive area and the type of adhesive used. Notes with less tackiness, such as due to a smaller adhesive area as shown in FIGS. 3A and 3B as compared to FIGS. 2A and 2B, may be more appropriate for use on fragile objects such as thin sheets of paper (e.g., so-called "onion skin" paper), especially if removal and reapplication of the note 100 is contemplated. The size of the adhesive area is easily adjustable to permit manufacture of different hinged notes 100 with larger or smaller adhesive areas to suit various applications and different types of objects 200. In some example embodiments, the adhesive area may be from about 30% to about 2% of the total area of the note 100.

The hinged notes 100 illustrated in FIGS. 1-3 are rectangular, but such notes can be of any shape. The hinged notes 100 illustrated in FIGS. 1-3 also have a rectangular adhesive area or anchor portion 140, but the adhesive area can take any shape. The adhesive area is preferably generally proximate at least one periphery edge of the hinged note 100, but that is not required. Alternatively, the adhesive area may be in an interior portion of the note 100. For example, the adhesive area may be down the middle of the note 100 with two hinge portions—one on either side of the adhesive area—thus creating a double-flappable note. Moreover, the shape of the hinge portion 160 can also vary, but it works best if it is generally or substantially straight.

FIGS. 4A and 4B are a side view and exploded side view, respectively, of one example embodiment of the hinged note 100. According to this example, the anchor portion 140 and the hinge portion 160 are formed from a common member 170. That member 170 has a thicker section that forms the anchor portion 140 and a thinner section that forms the hinge portion 160 and also attaches to the message portion 120. The member 170 may be formed integrally from the same material throughout or may be constructed from separate pieces. An adhesive 180 attaches the member 170 to the message portion 120, and an adhesive 190 is used to attach the anchor portion 140 to an object, such as the object 200 (FIG. 1). As shown in FIG. 4A, the adhesive 180 attaches the top side of the member 170 to the back side of the message portion 120, but that arrangement can be reversed (i.e., the bottom side of the member 170 attaches to the top side of the message portion 120 via the adhesive 180). The bond between the member 170 and the message portion 120 is preferably stronger than the bond resulting from the adhesive 190, so that the adhesive 190 releases before the adhesive 180. In that way, the entire hinged note 100 is removed from a foreign object, rather than the hinged note coming apart, under removal force. The adhesive 180 may be first applied to either one of the message portion 120 or the member 170.

In the example shown in FIGS. 4A and 4B, the hinge portion 160 is characterized by a distance separating the message portion 120 from the anchor portion 140. That distance is preferably sufficient to prevent undue mechanical interference between the message portion 120 and the anchor portion 140 as the hinge portion 160 bends to folds over the hinged note 100. If the distance is too small, the hinged note 100 may not completely fold over and lay flat in a folded configuration. In the example construction illustrated in FIGS. 4A and 4B, the distance defining the width of the hinge portion 160 (measured horizontally as shown in FIGS. 4A and 4B) is preferably slightly in excess of the sum of the thickness of the message portion 120 plus the height difference of the anchor portion 140 relative to the height of the member 170 in the hinge portion 160. When different arrangements are used to construct the hinged note 100, a different distance may be necessary or desirable. For example, if the top of the message portion 120 attaches to the bottom of the left side of the member 170, then the width of the hinge portion 160 may be only slightly in excess of the thickness of the member portion 120.

The width of the hinge portion 160 is preferably minimized to reduce movement of the message portion 120 while writing due to buckling of the weaker hinge portion 160. Too great a distance between the message portion 120 and the anchor portion 140 may cause such undesirable movement. Thus, the optimal distance, in the absence of other factors, is just enough to avoid mechanical interference or pinching while folding but little or no more than that.

The anchor portion 140 and the hinge portion 160 may be constructed integrally as a two-sided tape having two thicknesses and with offset, non-overlapping areas of tape on the top and bottom. Alternatively, the anchor portion 140 and the hinge portion 160 may be constructed integrally as a one-sided tape having two thicknesses and an adhesive only on one side, generally aligned with the thicker anchor portion 140. In the latter, case, the adhesive 180 is preferably provided pre-applied to the message portion 120, such as when the message portion 120 is a conventional repositionable note.

The hinged note 100 may alternatively be constructed integrally from one material that is both suitable for bearing writing and suitable to hold the adhesive 190 under the anchor portion 140. The hinged portion 160 may be a thinner section of the note's material, thus providing a more bendable/flexible portion that functions as an articulating joint.

Figure 5:
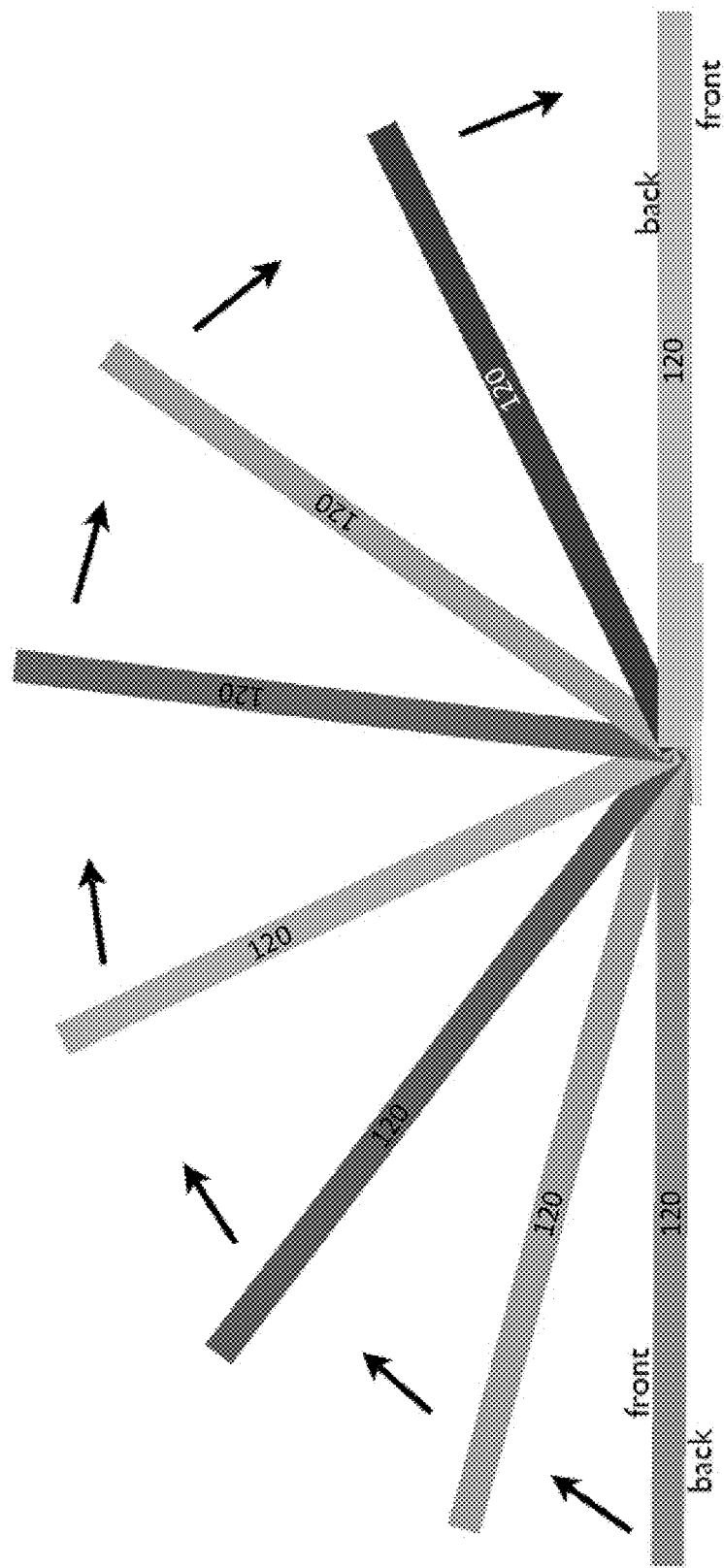
FIG. 5 is a diagram illustrating a folding operation to change a hinged note from a first, unfolded configuration to a second, folded configuration, according to one embodiment.
Figure 6A:
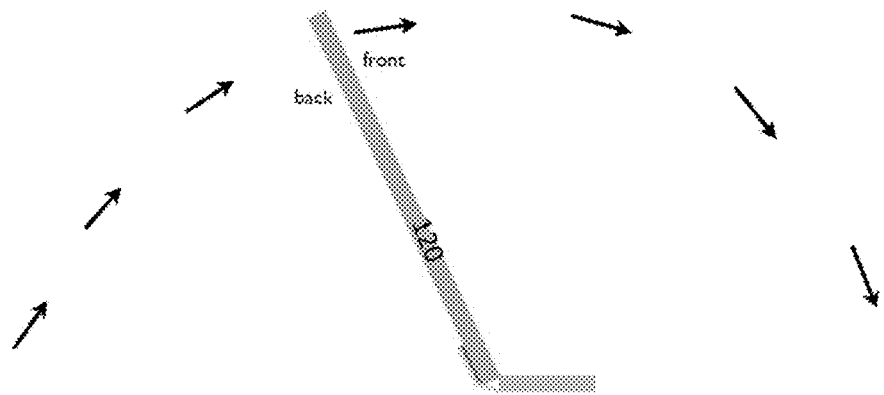
FIG. 6A is a first diagram illustrating a first stage of a folding operation to change a hinged note from an unfolded configuration to a folded configuration, according to one embodiment.
Figure 6B:
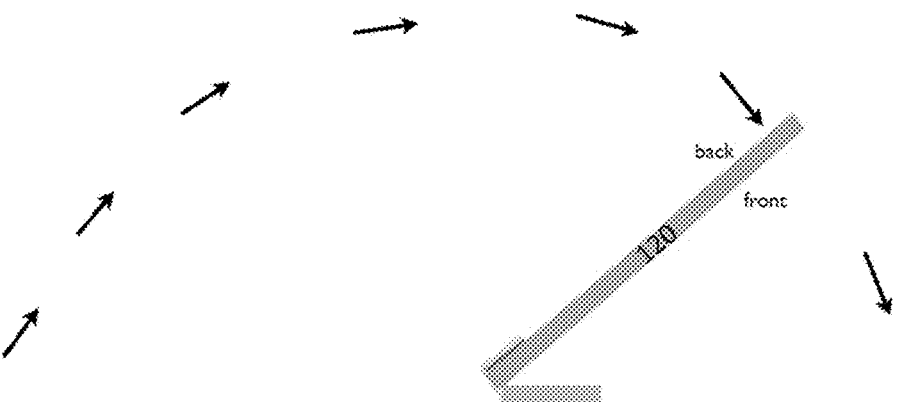
FIG. 6B is a second diagram illustrating a second stage of a folding operation to change a hinged note from an unfolded configuration to a folded configuration, according to one embodiment.
Figure 6C:
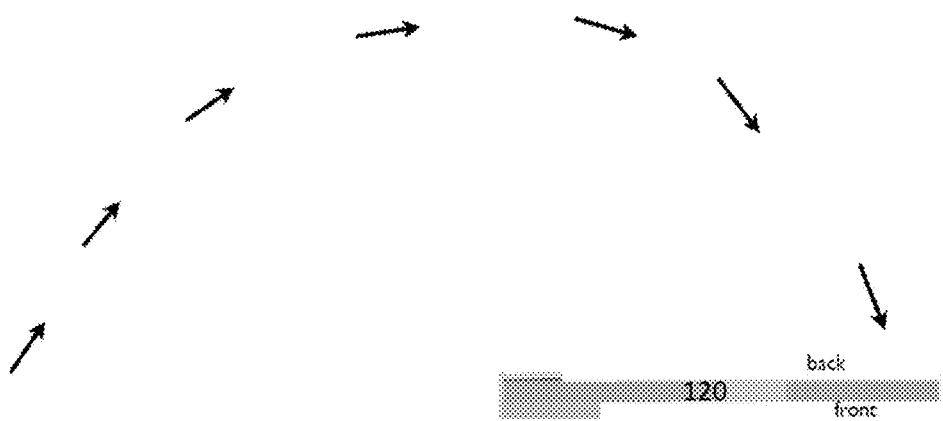
FIG. 6C is a third diagram illustrating a third stage of a folding operation to change a hinged note from an unfolded configuration to a folded configuration, according to one embodiment.

FIG. 5 is a diagram illustrating a folding operation to change the hinged note 100 from a first, unfolded configuration to a second, folded configuration, according to one embodiment. This folding operation transforms the hinged note 100 from having its front side up to having its back side up. FIGS. 6A, 6B, and 6C are diagrams illustrating three different stages of a folding operation to change a hinged note from the first, unfolded configuration to the second, folded configuration.

The ways to turn the hinge note 100 over are many. When using an object to turn it over, an object may be placed underneath the message portion 120 opposite of the hinge portion 160. The object used to turn the note 100 over can also be placed at the start of the note 100 edge opposite of the hinge without going under the paper and with light force pushing the note edge forward. This action forces the paper edge forward and the note to buckle in the center of the note and then flip the edge of the note being pushed up and the object can then finish pushing the note forward and over. Also, most objects including fingers and writing utensils can be placed at the paper note edge opposite of the hinge portion 160 and the actions of flicking, flipping, pushing can be used to force the note over 180°. Light force up away from the surface may move/rotate the note 100 up, forward/backward, and then downward 180° until the note lays flat on the surface of the object 200, exposing the writeable back side of the note 100. The force required may be comparable to a light breath needed to blow out a small birthday candle flame which is accomplished all over the world by very small children to aging adults. Anyone who can lift a finger or hand off a table 6 inches and forward 6 inches can turn over the note 100. Anyone who can blow out a small birthday candle flame can turn over the note 100. Thus, the hinged note 100 may be especially useful for those having disabilities. Yet another way to turn the note over 180° is to take in one's hand or hands the object 200 to which the note 100 is attached and move the object 200 in a brisk circle arch of approximately 10 inches. The force created by that motion may turn the note 100 over automatically. This can be reversed to return the note 100 to its alternate position. Also, user can turn the object 200 upside down or sideways and the note 100 may automatically rotate over. This same rotation may be accomplished when the note 100 is stuck to a text book page and the user turns the page. This action will often times cause the note 100 to automatically rotate over.

Objects that may be used to turn the note 100 include, but are not limited to, any finger or thumb and any hand; writing utensil of all shapes and sizes including pencils, pens, and markers; other paper notes or various sized paper of all thickness; one's breath as described above; the taking of a text book in of one's hand or hands and moving the book in a brisk circle arch of approximately 10 inches; turning the text book or other object 200; and placing one's tip of the tongue on the paper note edge opposite of the hinge and lifting one's head.

Figure 7:
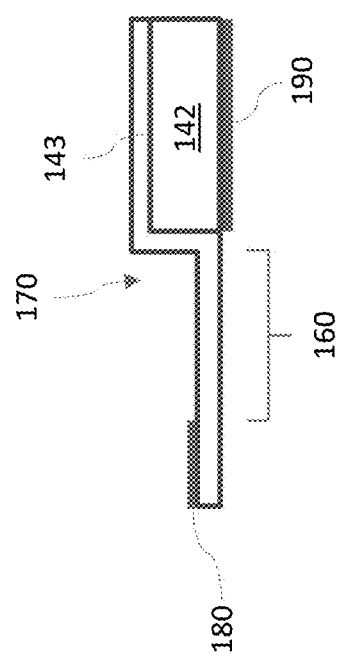
FIG. 7 is a side view of an anchor and hinge portion of a hinged note, according to one embodiment.

FIG. 7 is a side view of the member 170 according to another example embodiment. In this example, the member 170 is constructed of member components 142 and 143. The component 142 is thicker and comprises part of the anchor portion 140. The component 143 is thinner and forms the hinge portion 160. A double-sided tape may be used to form the thicker component 142 and the adhesive 190 collectively. The top side of such tape adheres to the thinner component 143, which may be a plastic film. Although FIG. 7 illustrates the adhesive 180 on the thinner component 143, the adhesive 180 may instead be pre-applied to the message portion 120. In one example, the message portion 120 is a conventional repositionable note, and the adhesive 180 is the adhesive pre-applied to a portion of the back side of such a conventional repositionable note. It has been found that such an adhesive sticks well to plastic wrap, such as, for example, SARAN WRAP®.

Figure 8:
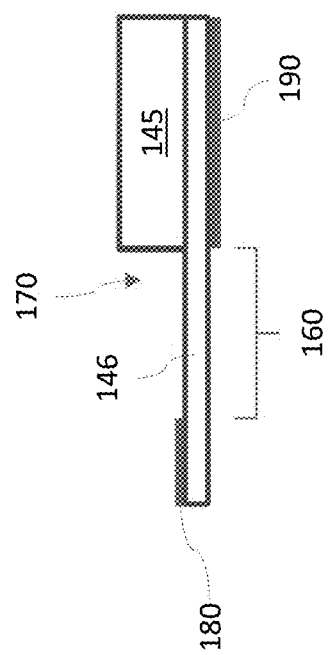
FIG. 8 is a side view of an anchor and hinge portion of a hinged note, according to another embodiment.

FIG. 8 is a side view of the member 170 according to another example embodiment. In this example, the member 170 is also constructed of member components, denoted as components 145 and 146 in this example. The member component 145 is a thicker piece that is the top of the anchor portion 140, whereas the thinner component 146 comprises the hinge portion 160. The thinner portion 146 is preferably flexible and bendable, whereas the thicker portion 145 provides more stability to the anchor portion 140. The components 145 and 146 may be joined by any suitable manner.

Figure 9:
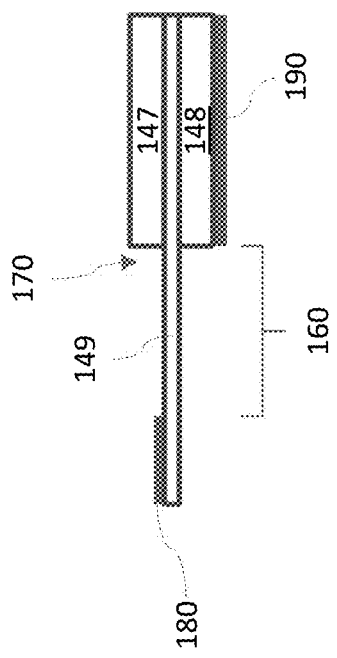
FIG. 9 is a side view of an anchor and hinge portion of a hinged note, according to yet another embodiment.

FIG. 9 is a side view of the member 170 according to another yet example embodiment. In this example, the member 170 is constructed of three member components 147, 148, and 149. The components 147 and 148 sandwich the component 149, which comprises the hinge portion. The components 145 and 146 may be joined by any suitable manner.

The parts illustrated in FIGS. 4A, 4B, and 7-9 may have any suitable thicknesses. For example, anchor portion 140 or components 142, 145, 147 and/or 148 may be, for example, from approximately 0.05 mm to approximately 0.08 mm thick. The hinge portion 160 or components 143, 146, and 149 may be, for example, from approximately 0.02 mm to approximately 0.03 mm thick. The adhesive 190 may be a layer that is, for example, approximately 0.01 mm thick.

According to one embodiment, the hinged note 100 may be constructed so that it automatically returns from the front-down, turned-over, second configuration to the front-up, first configuration after the note 100 has been turned over. This occurs when the weight of the message portion 120 is light enough that the tendency of the hinge portion 160 to return to its quiescent (straight) state in the first, unfolded configuration overcomes the inertia of the message portion 120. In that case, the hinged note 100 will automatically return to the first configuration after being placed in the second, folded configuration unless (1) the note 100 is held in the first configuration or (2) the hinge portion 160 is weakened at least temporarily such as by pressing a crease into it. However, if the plastic of the hinge portion 160 is sufficiently thin or has low resistance, a heavier piece of paper forming the message portion 120 would be too heavy to automatically flip back to the starting position. By adjusting the size and/or weight of the message portion 120 and the thickness and/or strength of the hinge portion 160, a desired behavior (either staying folded over permanently or for a desired temporary time or automatically folding back over at a desired rate) can be designed.

The hinged note 100 may be manufactured in a variety of ways. One such method is, broadly speaking, a two-part procedure. Part one involves a paper note. The back side of a note is preferably chemically treated to allow a PSA to adhere to the back side. Part two involves a single piece of tape extruded or otherwise constructed to have two sections of different thickness. Approximately two-third (or any other suitable fraction) of the width of the tape is thicker, for example, approximately 0.05 mm thick, and has PSA on its underside, while the remaining one-third is thinner, for example, approximately 0.02 mm thick and optionally has permanent adhesive applied to a portion of the top side, allowing this one-third section to be permanently or non-permanently adhered to the paper note. Alternatively, the adhesive securing the paper note to the top of the tape may be first applied to the paper note.

This method of manufacture involves: (1) Tape is laid flat on a flat surface with PSA side down. (2) Paper is laid on top of the one-third thinner section of tape (permanently or non-permanent adhesive has already been applied to either the paper or the one-third thinner section of tape before laying paper down on top of the one-third section). (3) The paper and one-third section of tape are pressed together briefly and optionally exposed to infrared or other drying environment to expedite adhesive curing/drying. (4) A pre-determined amount of these completed sheets are stacked on top of each other. (5) A backing sheet can optionally be positioned as the bottom sheet. (6) These grouped sheets are then cut to desired note size and/or shape.

An alternative method of manufacture, suitable for a three-part version, involves the same method as above except the tape consists of two pieces. One piece of the tape is thicker and the second piece of the tape is thinner. The thinner piece is permanently or non-permanently adhered to the thicker tape. This method of manufacture involves: (1) The thicker tape is laid flat on a flat surface with its PSA side down. (2) A thinner plastic piece is permanently or non-permanently adhered to the thicker tape with overlap on one side. (3) A paper note is laid on top of the overlap (permanently or non-permanent adhesive has preferably already been applied to either the overlap or the paper note before laying paper down on top of the overlap). (4) The paper and overlap are pressed together briefly and optionally exposed to infrared or other drying environment to expedite adhesive curing/drying. (5) A pre-determined amount of these completed sheets are stacked on top of each other. (6) A backing sheet can optionally be positioned as the bottom sheet. (7) These grouped sheets are then cut to desired note size and/or shape.

HRNs, such as the hinged note 100, are useful in many ways. In general, a hinged note can be used just as a conventional repositionable note and offer the same uses. Moreover, the hinged nature of HRNs allows them to be used in other ways not readily possible with conventional repositionable notes. For example, a hinged note can be used in a flashcard mode, with questions written on the front and answers written on the back. Such flashcard hinged notes can be strategically placed in textbooks to reinforce concepts taught on the page to which the hinged note is attached. Such flashcard hinged notes can be made and placed by parents or teachers before giving a reading assignment to students, or made and placed by students as a self-study aid.

Figure 11:
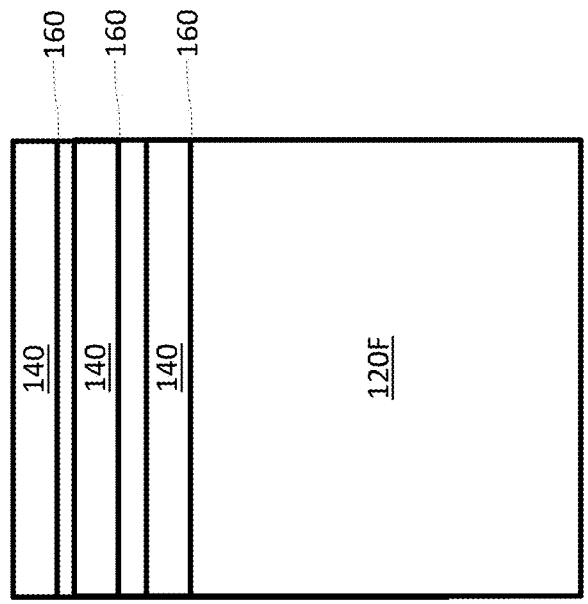
FIG. 11 is a top view of three hinged notes stacked in a second arrangement.
Figure 10:
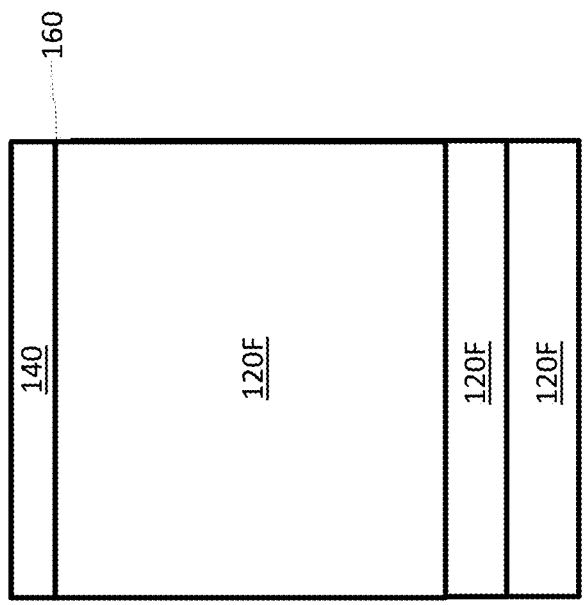
FIG. 10 is a top view of three hinged notes stacked in a first arrangement.

FIGS. 10 and 11 illustrate two ways of collecting related sticky notes 100 together in a group. This may be useful to collect a set of notes of related information, such as phone numbers, names, and time period of when tasks were completed or initiated. With currently known repositionable notes, there is no organized way of doing this because the notes do not stick well to each other and each note needs to be lifted and unstuck completely from a preceding note in order to access information underneath. For this reason, users sometimes discard old completed notes only to find they wished they had not done so. With hinged notes or HRNs, the clear sticky strip can be stuck on top of the preceding clear sticky strip in such a way as to create one unit (a mini-book of hinged notes) where each page freely rotates 180° for convenient and quick viewing when one needs to refer to completed notes. Both the front and the back side of the notes can be viewed easily by simply turning the stack of notes. Additionally, user can date each note for more detailed referencing, if desired.

FIG. 10 is a top view of three hinged notes stacked in a first arrangement. In this arrangement, the top hinged note has its front side 120F facing up, whereas the two underneath notes have their bottom sides facing up. In this way, the adhesive area of the second note sticks to the top note's back side, which may have better adhesion properties than its front side. In this arrangement, the stack of hinged notes are staggered, and each one can be flipped individually, or they can be flipped together.

FIG. 11 is a top view of three hinged notes stacked in a second arrangement. In this arrangement, all three notes are face up. In this arrangement, each note is stuck to the front side 120F on the note immediately underneath it. In this arrangement, the stack of hinged notes are staggered, and each one can be flipped individually, or they can be flipped together.

Figure 12:
FIG. 12 is a perspective view of two hinged notes in an easel arrangement.

FIG. 12 is a perspective view of two hinged notes in an easel arrangement. In this easel arrangement, the back side of the bottom note is the display side of the easel, and the top note forms the back leg of the easel. When this easel is laid flat, the bottom note hinges at the bottom of the easel, and the top note folds over to partially cover part of the front side of the bottom note. In this way, two hinged notes or HRNs can lay flat on a page of a closed book but then be popped up when the book is opened to that page. Such an easel can be used as a study aid.

CONCLUSION

The terms and descriptions used above are set forth by way of illustration and example only and are not meant as limitations. Those skilled in the art will recognize that many variations, enhancements and modifications of the concepts described herein are possible without departing from the underlying principles of the invention. The scope of the invention should therefore be determined only by the following claims, claims presented in a continuation patent application, and equivalents to the foregoing claims.

The invention claimed is:

1. A method for using a two-sided articulating note comprising a generally flat writing portion having opposing front and back sides and a hinged edge, an anchor portion, and a pre-designed joint portion between and connected to the anchor portion and the hinged edge of the writing portion, the method comprising:
    configuring the two-sided articulating note in a first configuration by securing the anchor portion to an object so that the front side of the writing portion is exposed and the back side of the writing portion faces the object while the two-sided articulating note lies flat on object;
    writing on the front side of the writing portion while the two-sided articulating note is in the first configuration;
    configuring the two-sided articulating note in a second configuration by folding over the two-sided articulating note about the joint portion to cause the back side of the writing portion to be exposed and the front side of the writing portion to face the object while the two-sided articulating note lies flat on the object; and
    writing on the back side of the writing portion while the two-sided articulating note is in the second configuration,
    wherein the object is a page in a book and wherein the anchor portion is substantially transparent, and the wherein securing the anchor portion to the page comprises securing the anchor portion to the page such that the hinged edge is positioned between lines of text on the page, so that no text is obscured by the two-sided articulating note regardless of whether the front or back side of the writing surface is exposed.

2. A method according to claim 1, wherein the anchor portion is substantially transparent, and the wherein securing the anchor portion to the page comprises securing the anchor portion to the page such that the hinged edge is positioned between columns of text on the page, so that no text is obscured by the two-sided articulating note regardless of whether the front or back side of the writing surface is exposed.

3. A method according to claim 1, further comprising:
    folding back over the two-sided articulating note about the hinge portion to cause the front side of the writing portion to be exposed again and the front side of the writing portion to face the object again while the two-sided articulating note again lies flat on the object.

4. A method according to claim 3, further comprising:
    repeating the folding over and folding back over steps, each time resulting in the two-sided articulating note again lying flat on the object.

5. A method according to claim 1, further comprising:
    removing the anchor portion from the object to thereby release the two-sided hinged note.

6. A method according to claim 5, further comprising:
    after removing the anchor portion from the object, securing the anchor portion to the object again.

7. A method according to claim 5, further comprising:
    after removing the anchor portion from the object, securing the anchor portion to a different object.

8. A method according to claim 1, wherein the two-sided articulating note is a first two-sided hinged note, the method further comprising:
    securing the anchor portion of a second two-sided articulating note to the first two-sided hinged note, thereby covering at least a portion of the first two-sided articulating note.

9. A method according to claim 8, further comprising:
    folding over the second two-sided articulating note about its hinge portion to cause the back side of the writing portion of the second two-sided articulating note and said at least a portion of the first two-sided articulating note to be exposed.

10. A method according to claim 1, wherein said configuring the two-sided articulating note in the second configuration comprises applying force to the writing portion of the two-sided articulating note, and wherein removal of the force from the writing portion of the two-sided articulating note causes the two-sided articulating note to return automatically to the first configuration.

11. A method according to claim 10, wherein said applying force to the writing portion of the two-sided articulating note comprising blowing toward the two-sided articulating note.

12. A method according to claim 10, wherein said configuring the two-sided articulating note in the second configuration comprises:
    applying force to the writing portion of the two-sided articulating note to cause the two-sided articulating note to enter the second configuration; and
    pressing along the joint portion to cause the two-sided articulating note to remain stably in the second configuration until disturbed.

13. A method according to claim 1, wherein the writing on the front side of the writing portion is a question, and the writing on the back side of the writing portion is an answer to the question.

* * * * *